United States Patent [19]
Bezos

[11] Patent Number: 5,944,391
[45] Date of Patent: Aug. 31, 1999

[54] ELECTRONIC FAIL SAFE CIRCUIT FOR ELECTRO-PNEUMATIC BRAKE CONTROL

[75] Inventor: Angel P. Bezos, Rockville, Md.

[73] Assignee: Pulse Electronics, Inc., Rockville, Md.

[21] Appl. No.: 08/829,819

[22] Filed: Mar. 25, 1997

[51] Int. Cl.[6] .............................. B60T 15/14; B60T 11/26
[52] U.S. Cl. .................................... 303/15; 303/3; 303/20
[58] Field of Search ................................ 303/3, 8, 15–18, 303/33–38, 40, 47, 68–69, 86; 246/167 R, 187 R; 395/185.08

[56] References Cited

U.S. PATENT DOCUMENTS

| | | | |
|---|---|---|---|
| 5,192,118 | 3/1993 | Balukin et al. | 303/15 |
| 5,222,788 | 6/1993 | Dimsa et al. | 303/15 |
| 5,267,473 | 12/1993 | Bezos et al. | 73/129 |
| 5,332,297 | 7/1994 | Cunkelman et al. | 303/15 |
| 5,393,129 | 2/1995 | Troiani et al. | 303/3 |
| 5,503,469 | 4/1996 | Cunkelman | 303/15 |
| 5,563,799 | 10/1996 | Brehmer et al. | 364/481 |
| 5,564,794 | 10/1996 | Hart | 303/3 |
| 5,586,813 | 12/1996 | McKay et al. | 303/22.4 |
| 5,662,391 | 9/1997 | McKay | 303/22.4 |
| 5,722,736 | 3/1998 | Cook | 303/15 |
| 5,730,504 | 3/1998 | Gaughan | 303/3 |
| 5,746,484 | 5/1998 | Gaughan et al. | 303/3 |
| 5,788,338 | 8/1998 | Hart et al. | 303/3 |

Primary Examiner—Chris Schwartz
Attorney, Agent, or Firm—Whitham, Curtis & Whitham

[57] ABSTRACT

An electronic fail safe circuit ensures that if there is a microprocessor failure during a brake application, this failure does not result in a release of the brakes. This is accomplished by the fail safe circuit forcing the appropriate solenoids to the self-regulating valve's hold state for a certain amount of time. This, in combination with the self regulating valve, accomplishes the desired outcome of a minimum disruption in the brake application and, specifically, prevention of an erroneous brake release. To further enhance the reliability of the system, a dual battery power supply is used. Each battery is tested prior to doing a brake application. Each battery has to pass the test, i.e., each battery individually must have enough charge to complete the brake application, before the brake application is undertaken. This redundancy concept is carried into the wiring of the release solenoid so that a single failure in the wiring will not result in de-energizing the release solenoid during a service brake application. Finally, a hardware interlock is enabled whenever a service brake application is started and is disabled otherwise. When enabled, the hardware interlock prevents the microprocessor from directly de-energizing the supply solenoid when the exhaust solenoid is also de-energized which, if allowed, could cause the brake pipe pressure rate of reduction to exceed the allowed limits.

11 Claims, 5 Drawing Sheets

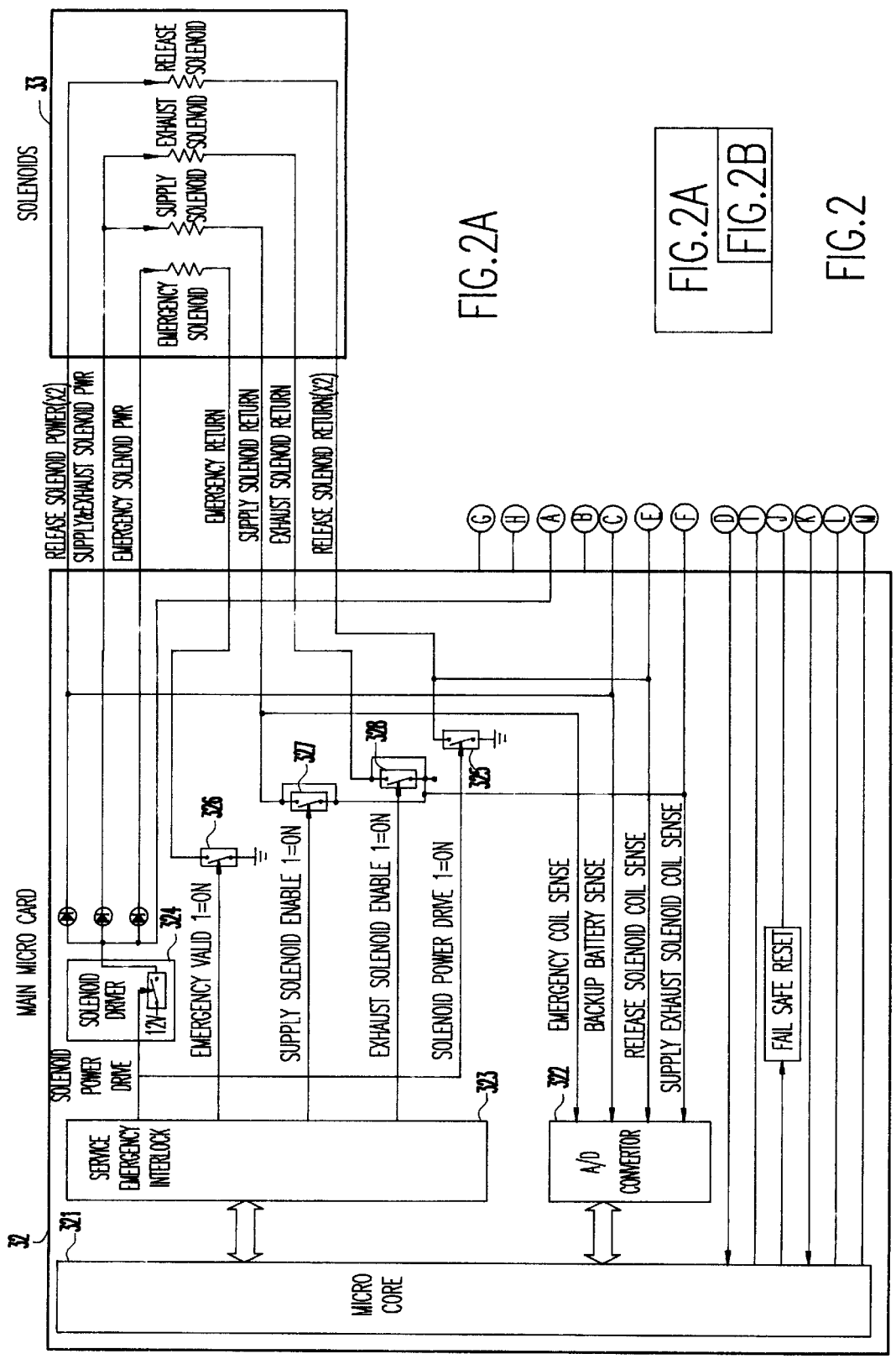

ELECTRONIC FAIL SAFE CIRCUIT FOR ELECTRO-PNEUMATIC BRAKE CONTROL

BACKGROUND OF THE INVENTION

1. Field of the Invention

The present invention generally relates to Electro-Pneumatic (EP) brake systems for railway trains and, more particularly, to a fail safe circuit for computer controlled railroad train brake systems.

1. Background Description

Electro-Pneumatic (EP) brakes for railway trains are controlled by radio frequency (RF) wireless transmission from a locomotive control unit (LCU), sometimes referred to as a head end unit (HEU), in the cab of the lead locomotive to an end of train (EOT) unit attached to the last car of the train. When a service brake application is made at the locomotive by operating the engineer's brake valve device, a coded radio signal corresponding to the level of braking requested by the engineer is transmitted to the EP brake control system in the EOT which initiates a service brake application sequence at the rear of the train. In the event of an emergency brake application requiring venting the brake pipe to atmosphere, the coded radio signal causes the EP brake control system to initiate an emergency brake application sequence at the EOT. The EP brake control system controls the various solenoid operated valves in the EOT according to the nature of the radio signal received and decoded.

The EP control system in the EOT is a microprocessor controlled unit which is battery powered. A failure of the microprocessor during a brake application can result in a release of the brakes. Such a failure of the microprocessor could be caused by several things, including but not limited to a failure of the battery supply and a failure (even temporary) of the microprocessor itself. For example, typically a brake application takes thirty seconds. If at any time during these thirty seconds the microprocessor were to fail in a way that the wrong commands are sent to the solenoids that drive the valve, an erronous brake application or the release of the brakes in the whole train could result.

A fail safe strategy is needed for safety of brake application because, after a service brake application is underway, one cannot allow a microprocessor failure to result in a brakes released condition even for the brief time (on the order of 0.2 seconds) that it will take an additional micro watchdog circuit to detect a microprocessor failure. The current system cuts the power off as part of the fail safe strategy so that the microprocessor cannot mistakenly energize the wrong solenoid. The fail safe circuit energizes the solenoid that needs to be energized and cuts off the solenoid that needs to be cut off. A brakes released condition can occur (that is, it may or may not happen) if the release solenoid is de-energized before a brake application is completed.

SUMMARY OF THE INVENTION

It is therefore an object of the present invention to provide an electronic fail safe circuit which operates in conjunction with a self-regulating pneumatic valve to insure that a microprocessor failure during execution of a brake application can be handled with a minimum of adverse consequences and specifically that such a failure does not result in the undesirable condition of a release of the brakes.

It is another object of the invention to provide an improved and more reliable dual battery supply for the microprocessor to insure that even an unexpected failure of one of the batteries does not result in a brake application problem.

It is a further object of the invention to provide redundant wiring for the brake release solenoid that needs to be kept energized during execution of a brake application, thereby increasing the reliability and safety of the brake system.

It is yet another object of the invention to provide a hardware interlock that does not allow the microprocessor to accidentally command the brakes released state.

According to the invention, there is provided an electronic fail safe circuit that ensures that if there is a microprocessor failure during a brake application, this failure does not result in a release of the brakes. This is accomplished by the fail safe circuit keeping one solenoid, the release solenoid, energized and two solenoids, the exhaust and supply solenoids, de-energized for a certain amount of time. This, in combination with a self regulating valve, accomplishes the desired outcome of a minimum disruption in the brake application and, specifically, prevention of an erroneous brake release.

To further enhance the reliability of the system, a dual battery power supply is used. Each battery is tested prior to doing a brake application. Each battery has to pass the test, i.e., each battery individually must have enough charge to complete the brake application, before the brake application is undertaken. This redundancy concept is carried into the wiring of the release solenoid so that a single failure in the wiring will not result in de-energizing the release solenoid during a service brake application.

Finally, a hardware interlock is enabled whenever a service brake application is started and is disabled otherwise. When enabled, the hardware interlock prevents the microprocessor from directly de-energizing the supply solenoid when the exhaust solenoid is also de-energized.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
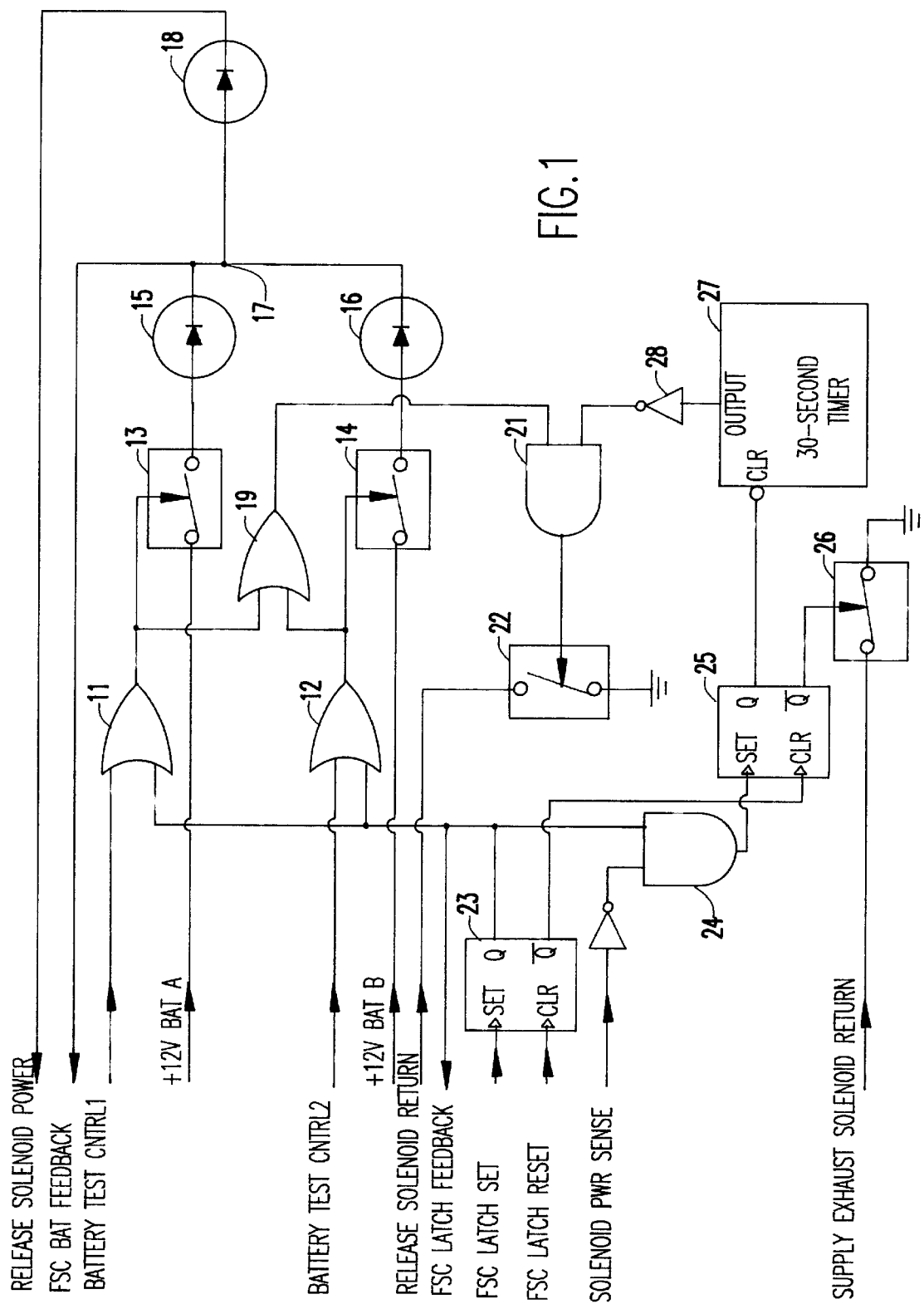
FIG. 1 is a block and logic diagram showing the fail safe circuit according to a preferred embodiment of the invention.

Referring now to the drawings, and more particularly to FIG. 1, there is shown a logic and circuit diagram of the fail safe circuit of the present invention. As will be appreciated by those skilled in the art, the actual circuit can be implemented in a number of ways. For example, the implementation can be with standard hardware building blocks (logic gates, timers, etc.) as illustrated in FIG. 1. However, the implementation can be done with a programmable gate array (PGA) or a low power microprocessor with suitable firmware dedicated for this purpose. Thus, the specific implementation shown and described here will be understood to be exemplary of but one of several equivalent ways to accomplish the function of the invention. The circuitry shown in FIG. 1 is designed to be fabricated on an auxiliary printed circuit board (PCB) added to a standard two-way EOT to implement the fail safe function. The integration of the PCB implementation is shown in more detail in FIG. 2, described hereinafter.

After the EOT receives a service brake application command, the first action of the EOT microprocessor will take before any other action is taken is to perform a battery test and then, if both batteries pass their test, to activate the electronic fail safe circuit. After the fail safe circuit is activated, the microprocessor does not have any further control over this circuit. Also, the circuit is self powered so neither microprocessor failure nor power failure can disable the circuit.

The microprocessor transmits, in succession, battery test control 1 and battery test control 2 signals to OR gates 11 and 12, the outputs of which are respectively connected to the gates of metal oxide semiconductor field effect transistor (MOSFET) devices 13 and 14, which are represented in FIG. 1 as switches. These battery test control signals are passed by OR gates 11 and 12, turning on devices 13 and 14 (closing the switches). When devices 13 and 14 are turned on, the voltage on respective ones of battery A and battery B are fed back to the microprocessor via diodes 15 and 16 to complete the battery test.

The battery test is performed under a load. The load is provided by the release solenoid. Power to the release solenoid is supplied from node 17 via isolation diode 18. The battery test control signals from OR gates 11 and 12 are both input to OR gate 19, the output of which is passed to AND gate 21. AND gate 21 is normally enabled, so the output of AND gate 21 turns MOSFET device 22 on making a return for the release solenoid. Thus, by successively turning on devices 13 and 14 and simultaneously turning on device 22, the microprocessor can obtain a measure of the voltage under load of each of the two batteries A and B.

If both of the two batteries A and B pass their tests, the fail safe circuit is then enabled by the microprocessor setting the start latch 23. When set, the start latch 23 provides a "1" at the Q output and a "0" at the $\overline{Q}$ output. The Q output is fed back to the EOT microprocessor to confirm that the fail safe latch 23 has been set. The Q output is connected to each of OR gates 11 and 12, thus turning on each of devices 13, 14 and 22. The Q output is also connected to one input of AND gate 24, enabling the AND gate when the latch 23 is set. The second input to AND gate 24 is an inverted solenoid power sense signal. Thus, ordinarily AND gate 24 provides a "0" output even when start latch 23 is set since solenoid power will be detected. However, if power fails after the start latch 23 is set, this will be sensed by the inverted solenoid power sense signal going to a "1". AND gate 24 then provides an output which sets loss of power latch 25. The $\overline{Q}$ output of start latch 23, when the latch is in its reset state, generates a "1" that is used to reset loss of power latch 25. When the start latch 23 is set, the $\overline{Q}$ output goes to "0", releasing the loss of power latch 25.

The $\overline{Q}$ output of the loss of power latch 25 is connected to the gate of MOSFET device 26 which connects the supply exhaust return to circuit ground. Device 26 is normally closed (conducting), but if the main power is cut off and the start latch 23 has been set, device 26 is opened (nonconducting), breaking the supply exhaust solenoid return. The Q output of loss of power latch 25 is supplied via an inverting reset input of thirty second timer 27. When in the loss of power latch 25 is in its reset state, the Q output is a "0" so that the inverting reset input is a "1", holding the timer 27 in its reset state. When loss of power latch 25 is set, however, the output to the inverting reset input goes low, releasing timer 27 and allowing it to begin counting. After thirty seconds, timer 27 provides an output which is inverted by inverter 28. As a result, the output of inverter 28 goes to "0", disabling AND gate 21, turning off device 22. Thus, device 22 is on energizing the release solenoid when the start latch 23 is set and continues on for thirty seconds even if the main power is cut off.

Figure 2B:
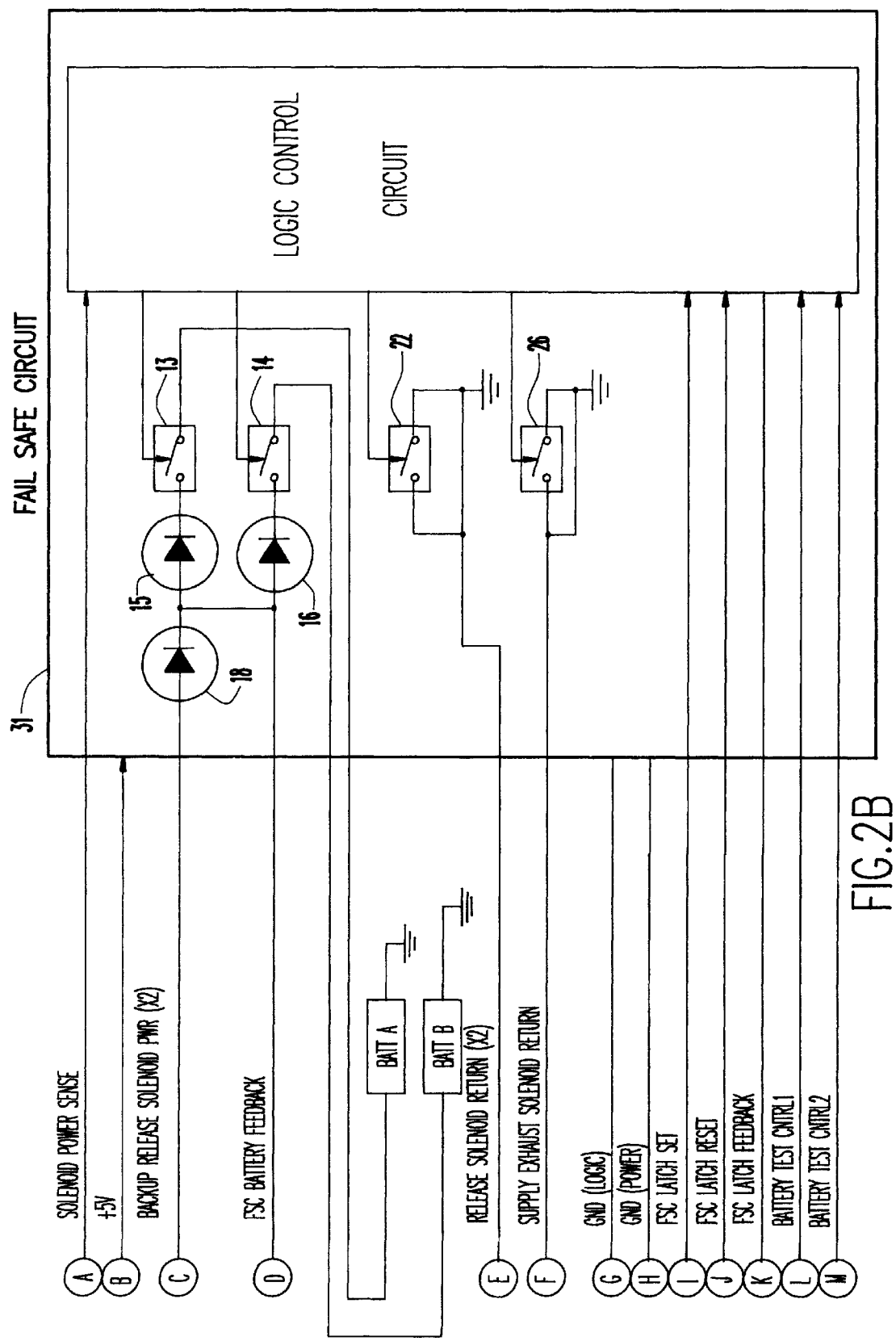
FIG. 2 is a more detailed block diagram showing the interface of the EOT microprocessor card and the fail safe circuit of FIG. 1 according to the present invention.

FIG. 2 shows the interface of the fail safe circuit printed circuit board (PCB) 31 to the main micro card 32 and the solenoids 33. The fail safe circuit on card 31 is the circuit shown in FIG. 1, and some of the circuit detail is shown in FIG. 2 to illustrate the interface. The dual batteries A and B are shown connected first to the main micro card 32 and then to the fail safe circuit card 31. On card 31, the battery connections are made as described above via MOSFET devices 13 and 14 and diodes 15, 16 and 18 back to the main micro card 32.

The main micro card 32 includes a micro core 321, which comprises the programmed microprocessor of the EOT, and an analog to digital (A/D) converter 322. Since detection of a microprocessor failure will take a certain amount of time, probably on the order of one second, a hardware interlock, independent of the microprocessor, is needed so that the emergency state cannot be accidentally caused by a failed microprocessor. Such a hardware interlock prevents significant and unsafe pressure changes in the valve's target pressure if the microprocessor happens to fail in a way to command the emergency state. To this end, the micro core 321 is connected to a service/emergency interlock 323. One output of the service/emergency interlock 323 provides a solenoid drive signal to the solenoid driver 324. The solenoid driver 324 include a MOSFET device (represented as a switch) which, when closed, supplies 12 volt power to each of the solenoids 33 via isolating diodes. The 12 volt output of the solenoid driver 324 is also supplied as the solenoid power sense signal to the fail safe circuit as described above.

The solenoid drive signal from the service emergency interlock also enables the release solenoid return by closing MOSFET device 325. Additional outputs of the service emergency interlock 323 enable an emergency solenoid return by closing MOSFET device 326, a supply solenoid return by closing MOSFET device 327, and an exhaust solenoid return by closing MOSFET device 328. Each of these MOSFET devices are represented in FIG. 2 as switches.

The service/emergency interlock 323 responds to a first plurality of pulses to begin a service brake application sequence and to a second plurality of pulses to begin an emergency brake application sequence. The number of pulses in the first and second pluralities is not important, only that they be different to differentiate the two commands. Either number of the first or second pluralities of pulses will energize the release solenoid by closing the solenoid driver 324 switch and the release solenoid return MOSFET device 325. The logic of the service/emergency interlock 323 for controlling the supply and exhaust solenoids through MOSFET devices 327 and 328 is simple and operates as follows:

Both solenoids can be "ON" at the same time.

Both solenoids can be "OFF" at the same time.

The supply solenoid can be "ON" and the exhaust solenoid can be "OFF" at the same time.

The exhaust solenoid is prevented from being "ON" if the supply solenoid is "OFF".

The micro core 321 also receives feedback from the solenoids 33 via the AA/D converter 322. Each of the solenoid returns are connected to the A/D converter 322. The supply and exhaust solenoid return devices 327 and 328 are connected in common as another input to the A/D converter 322. The fourth input to A/D converter 322 is a backup battery sense signal.

The electronic fail safe circuit, in combination with a self-regulating valve, ensures that if there is a microprocessor failure during a brake application, this failure does not result in a release of the brakes. As described above, this is accomplished in part by the fail safe circuit keeping one solenoid, the release solenoid, energized for a certain period of time.

Figure 3:
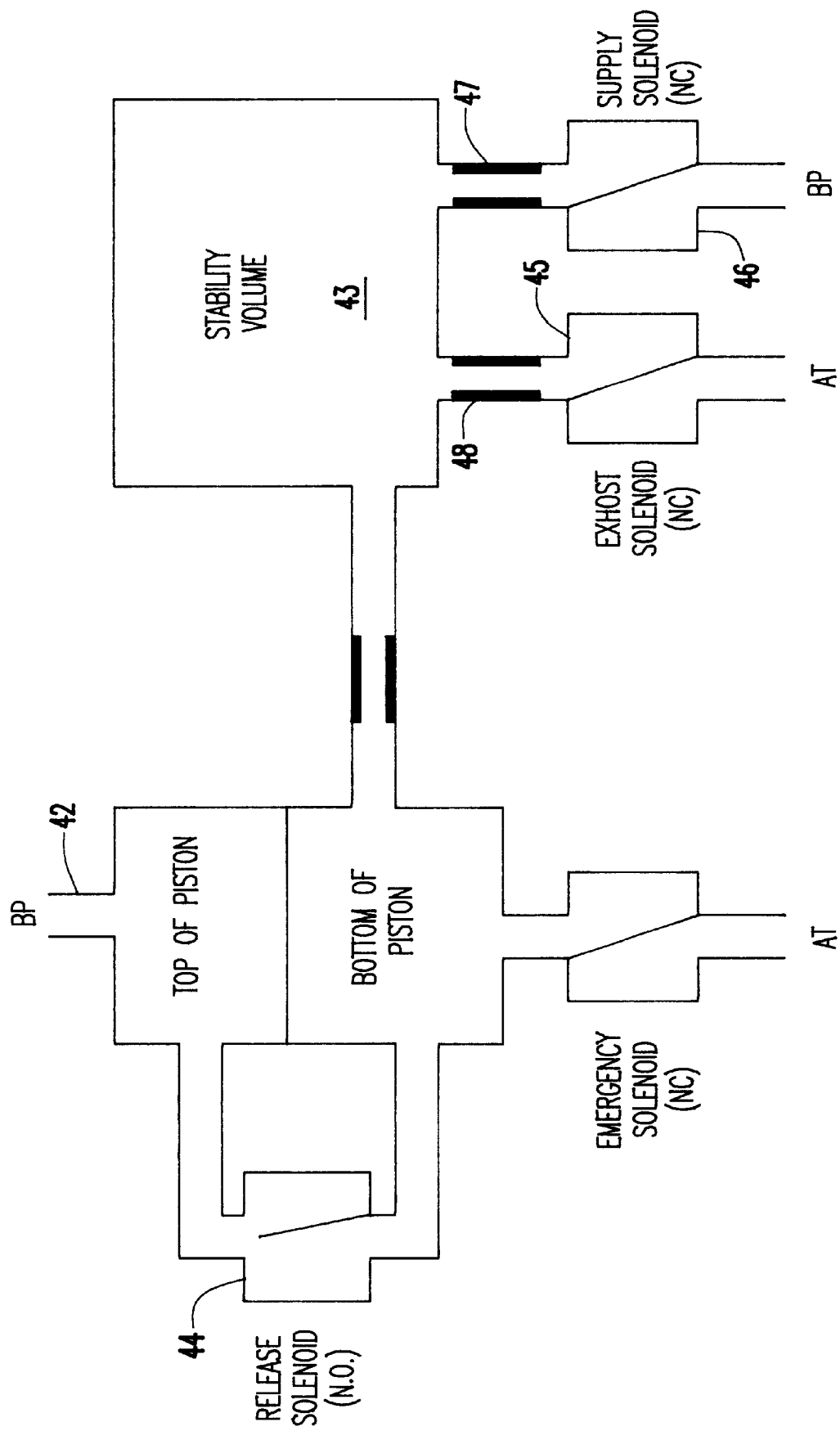
FIG. 3 is a schematic illustration of the self regulating valve used in conjunction with the fail safe circuit to prevent a release of the brakes should the EOT microprocessor fail during a brake application.

The self-regulating valve is schematically shown in FIG. 3 and comprises a relatively small, diaphragm operated actuating piston 41 which serves to unseat a single service/emergency poppet valve (not shown). Brake pipe pressure from brake pipe 42 is always present on the top side of the actuating piston 41, and a control pressure acting under this piston opposes the brake pipe pressure.

Two electro-pneumatic solenoid valves control the air flow into and out of the control pressure chamber, which is also connected to a stability volume 43 that maintains a control pressure. Normally, during release and running, the release solenoid actuated valve 44 is open and the exhaust solenoid actuated valve 45 is closed, allowing the control pressure of the stability volume 43 to match brake pipe pressure. Both valves are de-energized in these respective positions.

When a given brake pipe pressure service reduction command is received by the EOT, the reduction is achieved as follows. The control pressure exhaust solenoid actuated valve 45 is opened while the supply solenoid actuated valve 46 is also opened. Due to proper sizing of the supply and exhaust chokes 47 and 48, three things occur:

1. Control pressure in stability volume 43 reduces at a desired rate;
2. A pressure differential is created between the control pressure and the brake pipe pressures across the supply choke 47; and
3. This differential pressure unseats the brake pipe pressure exhaust valve, reducing the rear of train brake pipe pressure at the desired service rate, essentially matching the control pressure rate of reduction.

When the pressure transducer reading indicates that the brake pipe pressure at the EOT service has reached the target pressure, both the supply and exhaust valves are closed by de-energizing their respective solenoids. This is done nearly simultaneously but actually in rapid sequence, with the exhaust valve closing first.

Closing both valves traps the reduced control pressure in the stability volume 43, and the valve effectively becomes a pneumatic relay valve. It will cause the brake pipe pressure to be held at the target pressure in a self-regulatory manner, opening just enough to exhaust air pressure from the diminishing flow from the center section of the train brake pipe until the full length of pipe reaches the target reduction pressure.

The major safety consideration with the EOT is to prevent brake pipe pressure dynamics from causing an unintended brake release. This could happen, for example, if a remote EOT brake pipe pressure reduction is made but a failure in the device occurs prior to assuring that the complete brake pipe pressure has been sufficiently reduced. If the brake pipe exhaust valve is allowed to close prematurely, the higher pressure air in the center portion of the train will flow to the rear, increasing the rear brake pipe pressure and endangering a brake release.

The self-regulating valve makes it possible to avoid this problem if the supply and exhaust solenoids both fail initially in the closed position and then, after a set time, the release valve is allowed to open. After the thirty seconds elapse, there will not be any pressure differential between the top and bottom of the piston since the exhaust valve will be closed, and opening the release solenoid will have no consequence. Thus, with the exhaust valve closed and the release valve open, the EOT valve will not affect brake pipe pressure or normal train operation in any way. The delay time provided by the fail safe circuit with both valves closed allow the brake pipe valve to behave as a self-regulating pneumatic relay valve to stabilize the brake pipe pressure at the trapped control pressure in stability volume 43.

Figure 4:
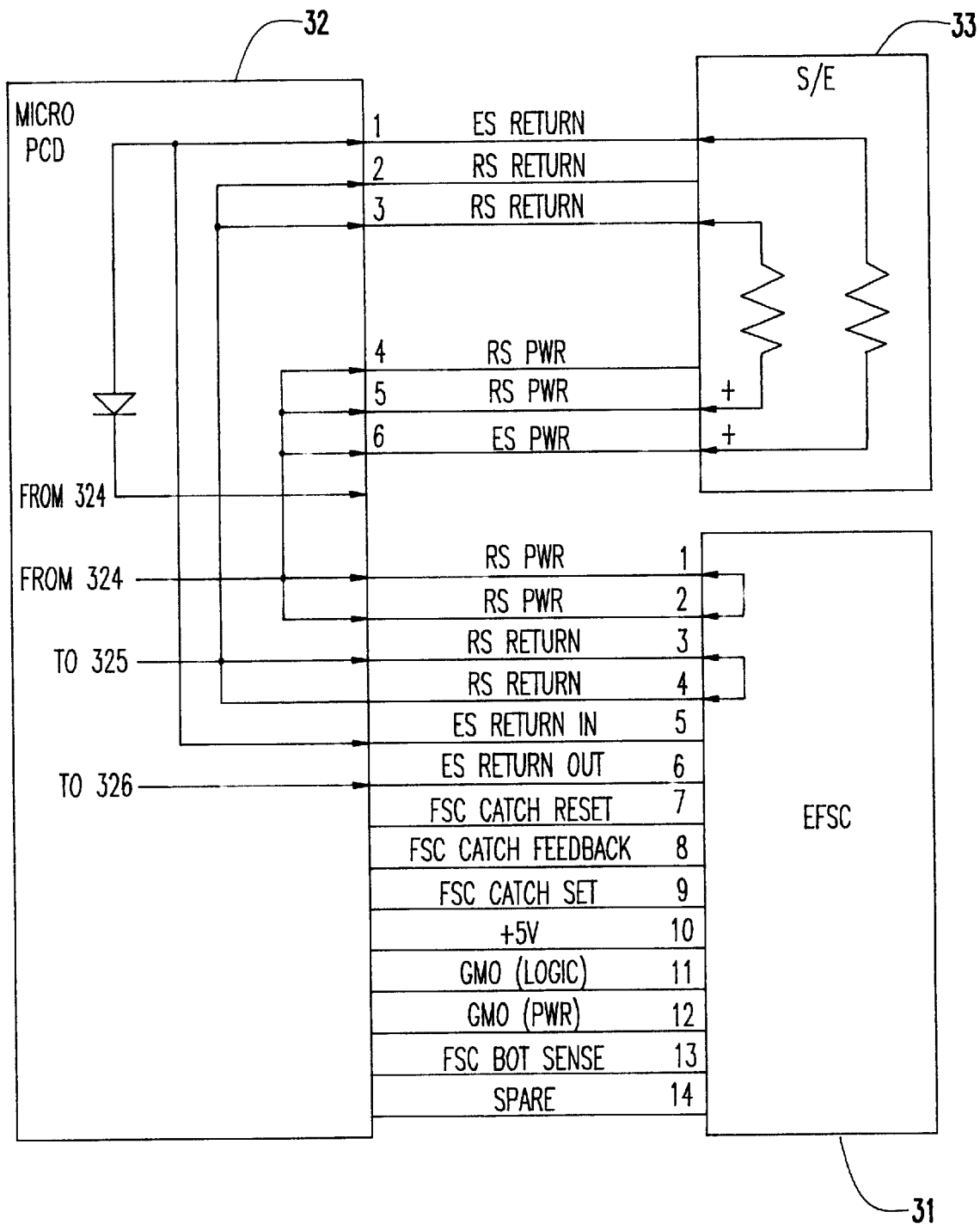
FIG. 4 is a simplified block diagram showing the dual wiring used for the power and return lines to the release solenoid.

To further enhance the reliability of the operation of the fail safe circuit and the self-regulating valve, dual wiring is used between the printed circuit boards (PCBs) for the release solenoid. This is shown in the simplified block diagram of FIG. 4 which shows that the release solenoid power and return lines from the fail safe circuit PCB 31 are connected on pins 1, 2 and 3, 4 to the main micro card 32, and the release solenoid power and return lines from the main micro card 32 are connected on pins 1, 2 and 3, 4 to the solenoid PCB 33.

The operation of the fail safe circuit is for a typical service brake application summarized as follows. The sequence is initiated by a service brake command and begins by verifying that the exhaust solenoid and the supply solenoid circuits are functioning properly. This is done by the exhaust and supply solenoid sense feedback to the micro core 321 via the A/D converter 322. If the exhaust solenoid and supply solenoid circuits do not pass the circuit continuity test, the brake application sequence is aborted. That is, the brake application is not even attempted. This, while not good, is not a catastrophic situation since the function of the device is to assist in the propagation of the brake application. The brakes on the train still apply but in the normal slower mode. If, on the other hand, the circuit passes the continuity test, then the service/emergency interlock 323 is opened. This is done by the generation of the correct number of pulses. After this is done, the 12 volt power is turned on by closing the switch in the solenoid driver 324.

As shown in FIG. 2, the battery power supply has two separate and independent batteries, battery A and battery B. These two batteries are connected to the main printed circuit board (PCB) 32 and then to the auxiliary fail safe PCB 33. The batteries are isolated from each other by diodes 15 and 16 on PCB 33 as shown in FIG. 2. With this arrangement, each battery can be monitored independent of the other. The circuitry on the PCB 33 loads each battery by the release solenoid so that its voltage can be measured.

The criteria for making a service brake application is that each battery, independent of the other, has a sufficient capacity to power the solenoid for a predetermined period of time. A service brake application would be undertaken only if both batteries pass this test. Only after passing this test is the fail safe circuit latch 23 set (see FIG. 1) by the microprocessor in the micro core 321 (see FIG. 2). Once the fail safe circuit latch is set, each of MOSFET devices 13, 14 and 22 (see FIG. 1) are turned on by the output of the fail safe circuit latch 23. The fail safe circuit latch 23 is read by the EOT microprocessor and, if set, the service brake application is commenced; otherwise, the service brake application is aborted.

One of the challenges in the implementation of an electronic fail safe in this device is to be able to have a high degree of assurance that the batteries are in good working order and that the batteries contain sufficient charge to carry out the brake application, or at the very least to keep the release solenoid energized for a sufficient amount of time (normally on the order of 10 to 20 seconds) so that the brakes will not be released. Since the electronics have been designed to consume very little power, the main power consumers are the solenoids. This requirement is addressed in the preferred embodiment by load testing each of the two batteries individually prior to a brake application. The batteries are loaded momentarily and the voltage is measured. Unless each battery by itself is found to have sufficient charge to perform the brake application, the brake application is not undertaken. Thus, the system can tolerate the unexpected failure of one of its batteries since both are checked prior to going ahead with the brake application and either one has enough charge to carry out the brake application.

The present invention thus provides a fail safe circuit and auxiliary logic control circuits which are connected to the main micro card. The purposes of these circuits includes:

An electronic fail safe circuit which operates in conjunction with a self-regulating pneumatic valve to insure that a microprocessor failure during execution of a brake application can be handled with a minimum of adverse consequences and specifically that such a failure does not result in an undesirable condition of a release of the brakes.

An individually tested dual battery supply for the release solenoid to insure that even an unexpected failure of one of the batteries does not result in a brake application problem.

Redundant wiring for the brake release solenoid that needs to be kept energized during execution of a brake application, thereby increasing the reliability and safety of the brake system.

A hardware interlock that does not allow the microprocessor to accidentally command the brakes released state.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An electro-pneumatic brake control for railroad trains comprising:

a control unit for mounting on a car of a train and incorporating a microprocessor responsive to brake commands from a lead locomotive of the train for generating control signals;

a self-regulating valve adapted to be connected to a brake pipe of the train and responsive to the control signals generated by the microprocessor to perform a brake function; and a fail safe circuit enabled by the microprocessor prior to performing the brake function and, upon detection of a failure of the microprocessor during the brake function, controlling the self-regulating valve to prevent a release of the brakes.

2. An electro-pneumatic brake control for railroad trains as recited in claim 1 wherein the fail safe circuit comprises:

a start latch set by the microprocessor prior to beginning of the brake function to enable the fail safe circuit, an output of the start latch being fed back to the microprocessor to confirm setting of the start latch; and timing means triggered by the output of the start latch to detect a failure of the microprocessor, said timing means upon detection of a failure of the microprocessor being operative to force the self-regulating valve into a stabilizing period followed by a released and charging state of the self-regulating valve.

3. An electro-pneumatic brake control for railroad trains as recited in claim 1 further comprising a power source for the fail safe circuit independent of a power source for the control unit.

4. An electro-pneumatic brake control for railroad trains as recited in claim 3 wherein the power source for the fail safe circuit comprises a dual battery supply, said microprocessor performing a voltage measurement of the dual battery supply under load prior to generating the control signals for the brake function to ensure there is sufficient charge to safely perform the brake function.

5. An electro-pneumatic brake control for railroad trains as recited in claim 4 wherein said microprocessor generates the control signals for a brake function only when each battery of the dual battery supply have enough charge to do a complete brake application.

6. An electro-pneumatic brake control for railroad trains as recited in claim 1 further comprising a service/emergency solenoid interlock which does not allow said microprocessor to command an emergency brake function when the interlock has been set by the microprocessor.

7. An electro-pneumatic brake control for railroad trains as recited in claim 1 wherein the self-regulating valve is a self-regulating pneumatic valve.

8. An electro-pneumatic brake control for railroad trains comprising:

a control unit for mounting on a car of a train and incorporating a microprocessor responsive to brake commands from a lead locomotive of the train for generating control signals for a brake function;

a self-regulating valve adapted to be connected to a brake pipe of the train and responsive to the control signals generated by the microprocessor to perform a brake function; and a dual battery supply for the control unit, said microprocessor performing a voltage measurement of the dual battery supply prior to generating the control signals for the brake function to ensure there is sufficient charge to safely perform the brake function.

9. An electro-pneumatic brake control for railroad trains as recited in claim 8 wherein said microprocessor generates the control signals for a brake function only when each battery of the dual battery supply have enough charge to do a complete brake application.

10. An electro-pneumatic brake control for railroad trains as recited in claim 8 wherein the voltage measurement of the dual battery supply is performed under load.

11. An electro-pneumatic brake control for railroad trains as recited in claim 8 wherein the self-regulating valve is a self-regulating pneumatic valve.

* * * * *